Sept. 13, 1966 R. A. SANDERSON 3,272,505

CAPACITIVE GUIDING APPARATUS FOR RECORD ELEMENTS

Filed Aug. 30, 1965 3 Sheets-Sheet 1

INVENTOR
ROBERT A. SANDERSON

BY Donald F Voss
ATTORNEY

Sept. 13, 1966 R. A. SANDERSON 3,272,505

CAPACITIVE GUIDING APPARATUS FOR RECORD ELEMENTS

Filed Aug. 30, 1965 3 Sheets-Sheet 2

United States Patent Office 3,272,505

Patented Sept. 13, 1966

3,272,505

CAPACITIVE GUIDING APPARATUS FOR RECORD ELEMENTS

Robert Arthur Sanderson, 14 Joyce Road, Wayland, Mass.

Filed Aug. 30, 1965, Ser. No. 494,290
4 Claims. (Cl. 271—71)

This application is a continuation-in-part of an application of Robert A. Sanderson, Serial No. 135,939, filed September 5, 1961, and now abandoned, and entitled, "Capacitive Guiding Apparatus for Record Elements."

This invention relates to apparatus for obviating the impedance to movement of record elements such as record cards, sheet material and moving webs or tapes where the impedance to movement is created by static electric charges accumulated upon the record elements as the same are being transported and, more particularly, to apparatus which utilizes the static charge to eliminate the impeding forces normally developed thereby.

Heretofore, it was common to provide apparatus for the eduction of electrostatic charges from the surfaces of materials of low electrical conductivity. It was also common to provide apparatus for directing charged gas particles against the record material being fed to bring the electrical condition of the record material to the desired electrical state; i.e., neutralizing the static charge. In the present invention, the static charge itself is utilized to eliminate the deleterious effects created. There is no attempt to eliminate or neutralize the static charge.

The invention finds particular utility in record card machines having a stationary guiding surface for directing the record cards into a stacking receptacle.

Accordingly, it is a prime object of the invention to provide apparatus which utilizes the static charge developed upon a record element being fed to eliminate the impedance created by the static charge to movement of the record element.

Another very important object of the invention is to provide apparatus for enabling freely moving record elements to continue to move after coming into contact with a stationary guiding surface even though the record elements have acquired a static charge prior to contacting said stationary guiding surface.

The foregoing and other objects, features and advantages of the invention will be apparent from the following more particular description of a preferred embodiment of the invention, as illustrated in the accompanying drawings.

Figures 1, 7:
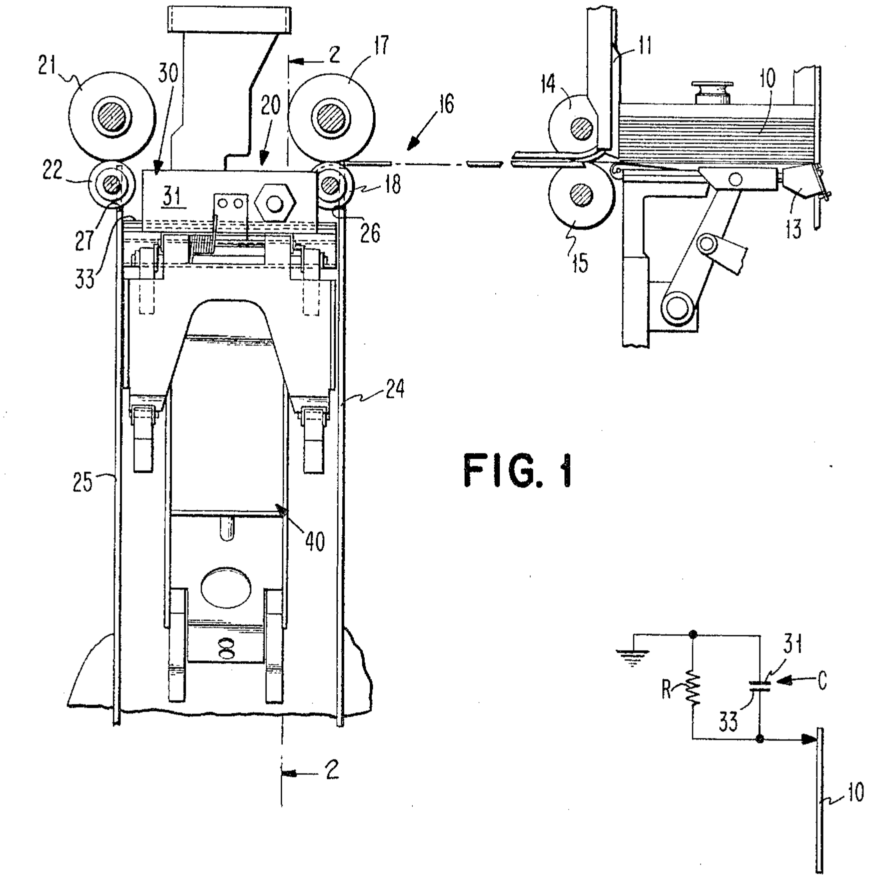
FIG. 1 is an elevational view of a record card machine embodying the invention.

With reference to the drawings and particularly to FIG. 1, the invention is illustrated by way of example as being incorporated into a record card business machine of the type generally described in U.S. Patent No. 2,964,314 to M. Fiehl granted on December 13, 1960, and in a patent application of M. Fiehl, Serial No. 98,884 dated March 28, 1961, and now Patent No. 3,066,-933, and assigned to the same assignee of the present invention.

Record cards 10 contained in card hopper 11 are adapted to be advanced therefrom in seriatim by picker knife 13 into the bite formed by a pair of cooperating feed rollers 14 and 15. The record cards 10 are conveyed or advanced by the feed rollers 14 and 15 along a predetermined card path 16, shown schematically. Normally, there would be some type of sensing means disposed in the card path which is adapted to sense the perforations in the record cards, and in response to sensing such perforations, develop electrical control signals. These electrical control signals are then utilized to selectively operate apparatus, not shown, for diverting the record cards 10 from the card path 16, as the same are further advanced by cooperating feed rollers 17 and 18, into a card stacking receptacle 20. If the record cards 10 were not to be diverted into the receptacle 20, they would continue to advance along the card path 16 under action of cooperating feed rollers 21 and 22.

The card stacking receptacle 20, FIG. 1, includes spaced apart walls 24 and 25 which are provided at their upper ends with cutouts 26 and 27 to permit the feed rollers 18 and 22 to extend therein as shown.

Figure 2:
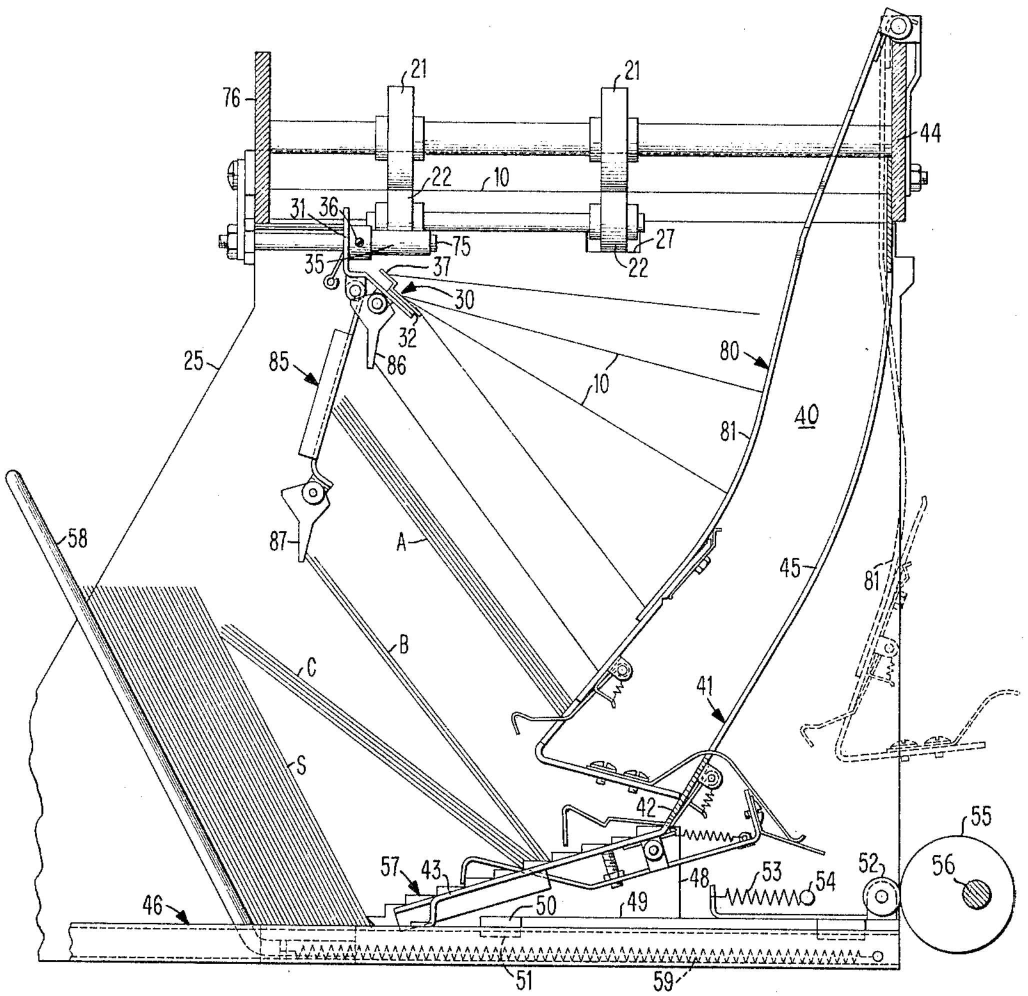
FIG. 2 is a side view taken along the line 2—2 in FIG. 1.

As any one record card 10 is diverted into the stacking receptacle 20, the forward motion of the record card is arrested by wall 25; FIG. 2, and, as the card drops, one edge of the card is restrained by a guiding member 30 so that the card pivots in a manner that the edge opposite thereof swings arcuately along a curved path as prescribed by an arcuate surface such as 81 of a guide member 40. The guide member 40 also has another arcuate surface 42 which can be used for guiding cards of greater length, as will be explained hereinafter. As the edge of the card 10 in contact with the arcuate surface of guide member 40 continues to follow along this surface, the opposite edge drops free of the guiding member 30 and falls forward. The guiding member 30 is shown in detail in FIG. 3 and a rear view thereof is contained in FIG. 1.

Figure 4:
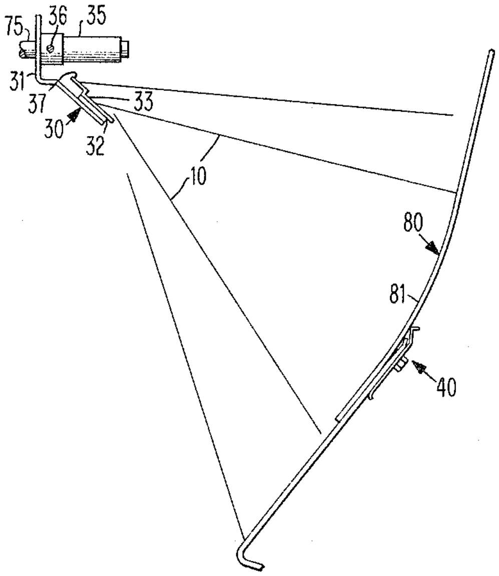
FIG. 4 is a schematic view illustrating the movement of record cards about the capacitive guiding surface for guiding the cards into a stacking receptacle.
Figure 5:
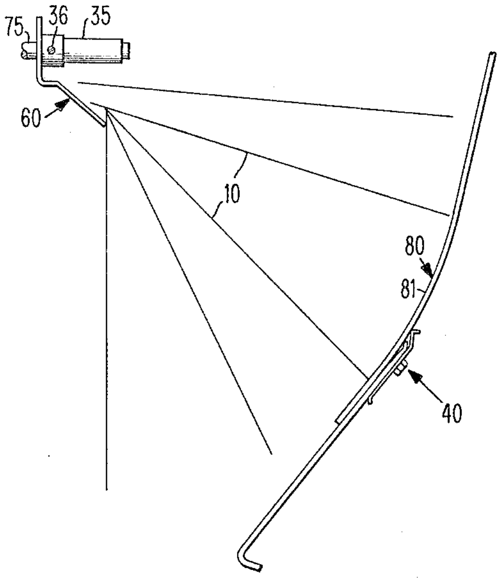
FIG. 5 is a schematic view illustrating the clinging of record cards to a non-capacitive guiding surface of a type heretofore used to guide the cards into a stacking receptacle.

Prior to the present invention, the cards 10 had a tendency to hang from rather than fall free of the guiding member such as a guiding member 60, of the type shown in FIG. 5, due to the static electric charges developed upon the cards 10 as they are advanced along the card path 16. This, of course, would cause a card jam as illustrated in FIG. 5. The guiding member 60 of FIG. 5 has been replaced with the guiding member 30, FIGS. 2 and 4; and the structure thereof will be described shortly.

The function of guiding member 30, as already stated, is to restrain one edge of the card 10 so that the card pivots in a manner that the edge opposite said one edge swings along a curved path prescribed by guide member 40. In addition to this function, the guiding member 30 also serves to receive an electrical charge from cards 10 which have acquired static electrical charges and hold this received charge to that the forces of attraction normally developed between a charged body and an uncharged body are eliminated or overcome by creating forces of repulsion. The forces of repulsion are created because of the particular construction of guiding member 30, the same enabling a portion of the static electrical charges upon the cards to transfer to it; hence, with both the guiding member 30 and the cards 10 having like electrical charges, forces of repulsion are developed.

Figure 3:
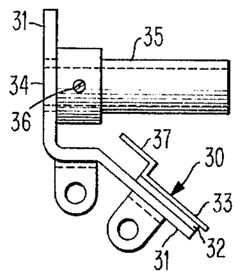
FIG. 3 is an enlarged detail view of the composite capacitive guiding surface.

The guiding member 30, in this example, is a composite structure, FIG. 3, consisting of a metallic angle plate 31, an electrical insulating member 32 in the form of a strip of dielectric material in juxtaposition to said plate 31 and a metallic card-supporting plate 33 in juxtaposition to said insulating member 32 to form an electrical capacitive unit capable of receiving an electrical charge and having a predetermined leakage of the charge acquired. The electrical charge is acquired as the one edge of the cards 10 come into contact with the card-supporting plate 33. The cards acquired a static electric charge as they were moved along the card path 16.

Figure 6:
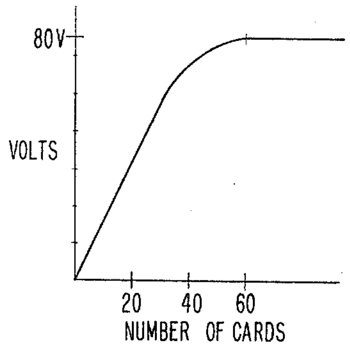
FIG. 6 is a diagram showing a resultant curve representing static voltage versus the number of record cards engaging the capacitive guiding surface; and, FIG. 7 is a circuit diagram of the equivalent circuit for the capacitive guiding surface.

A suitable electrical capacitive guiding member depends upon the particular application of use for the guiding member and the particular safety precautions desired. The parameters which affect the operation of the electrical capacitive guiding surface are the capacitance, the shunt resistance and the dielectric strength of the insulating member 32. While the capacitance is not a critical factor, it must be greater than zero and it is one of the controlling factors of the maximum electrical potential between the metallic plates 31 and 33. Another factor controlling the maximum electrical potential across the guiding member 30 is the shunt resistance. The shunt resistance of the insulating member 32 also determines the leakage current. The guiding member 30 discharges during the time after a first card 10 contacts the plate 33 of guiding member 30 and before a second card contacts the plate 33. When the electrical charge imparted to the guiding member 30, by virtue of a card-supporting plate 33, equals the electrical discharge due to leakage current, the voltage across plates 31 and 33 stops increasing as seen in FIG. 6. In this example, the curve in FIG. 6 is a resultant curve of both charge and discharge and it is seen that, approximately after 60 cards have come into contact with the card-supporting plate 33, the amount of charge substantially equals the amount of discharge. Hence, the curve levels off as shown. In FIG. 7, card 10 is shown schematically as contacting plate 33, which, in combination with plate 31 and insulating member 32 of guiding member 30, forms a capacitor C, the shunt resistance of insulating member 32 being indicated as resistance R which is electrically connected in parallel with capacitor C to ground potential. The dielectric strength of insulating member 32 must be sufficiently great to ensure that electrical breakdown thereof will not occur under the severest operating conditions.

In this example, the guiding member 30 is designed to have a capacitance of 350 $\mu\mu$farads $\pm 50\%$ at 1000 cycles per second. The leakage current is 0.1 to 1.0$\mu$ amperes at 500 volts D.C. and the dielectric strength of the insulating member 32 is equal to or greater than 1500 volts D.C. In this example, plates 31 and 33 are made of steel and the insulating member 32 is made of vulcanized fiber and is approximately .005 inch thick, 3.23 inches long, and .47 inch wide. The insulating member 32 is bonded to the plates 31 and 33 by any suitable bonding material.

The angle plate 31, FIGS. 1 and 3, is provided with a bore or hole 34 which communicates with a sleeve member 35, FIGS. 2 and 3, fixed to extend normally from the plate 31 as shown. A stud 75, FIG. 2, extending transversely of the card path 16 and suitably supported by a vertical support plate 76, journals the angle plate 31 and sleeve member 35 to permit the guiding member 30 to be moved therealong to prescribed positions and secured in any one prescribed position by means of set screw 36. By this arrangement, the spatial relationship between guiding member 30 and guide member 40 can be varied to suit cards of different lengths. Plate 33, FIGS. 3 and 4, of the guiding member 30 includes an integral extension 37 which serves to space the cards 10 as shown in FIG. 4.

The guide member 40, FIG. 2, is of the type disclosed in the aforementioned patent application to Fiehl, Serial No. 98,884, dated March 28, 1961. The guide member 40 comprises a fixed guide 41 and an adjustable guide 80.

The fixed guide 41, FIG. 2, includes an upper portion having an arcuate generally radial surface 42 which joins a downwardly inclined straightened surface 43 of a bifurcated lower portion. The upper portion is suitably secured to a back plate 44. A relatively wide, generally rectangular slot 45 extends substantially the full length of and through the arcuate surface 42 of member 41. However, the surface area remaining is adequate to provide a surface of proper configuration for guiding record cards 10 of a predetermined length, such as conventional 80-column record cards. The lower portion 43 comprises two integrally connected projections having their lower ends suitably secured to a bed member 46. The lower portion 43 is provided with an end opening U-shaped slot extending partway into the upper portion of fixed guide 41 so as to accommodate a reciprocable card pusher 48.

The card pusher 48 is mounted on a plate 49 which has transversely extending arms 50, the same overlie the side channel of the bed member 46. Plate 49 also has depending guides 51 that ride in a guide slot defined between said side channels. A roller follower 52 is carried on a pin supported by a lug secured to the plate 49. A spring 53 is anchored to a fixed pin 54 and connected to a lug secured to plate 49. The spring 53 biases plate 49 and, hence, pusher 48, in a manner to maintain the follower 52 in contact with a cam 55 eccentrically mounted on a suitable driven shaft 56. Hence, as cam 55 rotates, it reciprocates the card pusher 48 by means of follower 52 so that a stepped inclined surface 57 of a pusher will be alternately projected through the slot 47 and then withdrawn behind surface 42 to impart a leftward pushing action on the lower edges of the cards.

An inclined card support 58 extends down into the slot between the side channels of the bed member 46. A helical spring 59 anchored to the bed member 46 is connected to the lower end of the card support 58 to resiliently bias the latter toward the pusher 48. As the cards 10 accumulate on the stack S, the support 58 will yield leftward as necessary to maintain a substantially constant distance between the right-hand side of the stack and the fixed guide member 41.

The adjustable guide member 80 is hingedly supported by the back plate 44 so that it may assume the position shown in full line to accommodate or provide an arcuate guiding surface 81 for guiding cards of a shorter length, such as 51-column record cards, or be retracted to the position shown by the dashed lines so that the arcuate surface 42 of member 41 is the guiding surface for the longer 80-column cards. Greater details of the adjustable guide member 80 may be had by reference to the aforementioned patent application. Likewise, details of a deflector assemblage 85 and support members 86 and 87 may be had by reference to this application.

The mode of operation in this particular example is that record cards 10 are advanced from card hopper 11 in seriatim by picker knife 13 to cooperating feed rolls 14 and 15 which advance the record cards along the card path 16. Cooperating feed rollers 17 and 18 receive the record cards advanced along the record path 16 and move the same relative to the card-stacking receptacle 20. Assume that the selection mechanism, not shown, causes one of the record cards to advance along the record card path 16 to be diverted into the card-stacking receptacle 20. Further, it will be assumed that just prior to the record card entering the receptacle 20 it had acquired a static electric charge. The forward motion of the diverted card ceases when its leading edge hits and is stopped by the upper part of the side wall 25 that defines the down path side of the selected stacking receptacle 20. The left-hand edge (as viewed in FIG. 2) of the diverted card is temporarily supported upon the extension 37 of the card-supporting plate 33. The right-hand edge of the card then starts to swing downward in an arc as prescribed by the arcuate surface 81 of the adjustable guide member 80.

As the right-hand edge follows the arcuate surface 81, the left-hand edge leaves the extension 37 and drops onto the card-supporting plate 33. A portion of the static electric charge on the card along the left-hand edge is transferred to the capacitive guiding member 30. However, since a portion of the charge remains upon the card and since the capacitive guiding member 30 is charged with a like polarity, forces of repulsion are developed so that, when the right-hand edge of the card is sufficiently down along the arcuate surface 81, the left-hand or upper edge of the card drops free of the card support plate 33. The upper edge of the card is then temporarily supported by the upper support member 86. Member 86 thereafter swings clockwise and guides the upper edge of the card down onto the deflector assembly 85. A plurality of cards then tend to accumulate side by side at A. When the weight of these cards is sufficient, they drop to the position shown at B with the upper edges of the cards coming to rest temporarily on the member 87. The cards then swing the member 87 clockwise out of the way so that the cards swing generally to the position shown at C. In this position, the lower edges of the cards alternately rest upon the stepped surface 57 of the reciprocable card pusher 48 or upon the inclined surface 43 of the fixed guide member 41 depending upon the position of the pusher 48 relative to the guide member 41. As the pusher 48 is reciprocated by the rotating cam 55, acting through the follower 52, the cards will be progressively pushed leftward by the steps 57 until the cards are pushed onto the upper surface of the bed member 46 and become compacted against and form part of stack S.

From the foregoing, it is seen that the capacitive guiding member 30 is charged with a portion of the static charge accumulated upon the record cards 10. With both the record cards and capacitive guiding surface 30 having like electrical charges, forces of repulsion are developed which prevent the upper edge of the record cards 10 from residing or clinging to the guiding member 30. While the invention is shown and described as being incorporated in a record card machine having a stationary guiding surface for directing the record cards into a stacking receptacle, there is no intention to limit the invention to this particular application. Further, it is seen from the foregoing that the static charge developed upon the record elements and which tends to impede the movement of these record elements is utilized to overcome the impeding forces normally created by the static charge.

While the invention has been particularly shown and described with reference to a preferred embodiment thereof, it will be understood by those skilled in the art that various changes in form and details may be made therein without departing from the spirit and scope of the invention.

What is claimed is:

1. A unit record card processing machine comprising:
an electrically grounded frame;
feed means mounted on said frame for feeding unit record cards along a predetermined path within said frame; and
a guide member mounted on said frame and projecting into said predetermined path for preventing unit record cards carrying spurious electrostatic charges from adhering to said frame, said guide member comprising:
 a first electrically conductive member mounted on said frame;
 a second electrically conductive member projecting into said predetermined path so as to contact each unit record card, and receive a portion of the spurious electrostatic charge therefrom, and thereby electrostatically repel said unit record card; and
 a dielectric member mounted on said first electrically conductive member and supporting said second electrically conductive member, said dielectric member having a shunt resistance which is sufficiently high to allow said second electrically conductive member to receive an electrostatic charge for repelling each unit record card, but sufficiently low that the electrostatic charge imparted to said second electrically conductive member by each unit record card is dissipated through leakage current before the arrival of the next unit record card.

2. A unit record card processing machine of the type described in claim 1 wherein said first electrically conductive member may be selectively mounted on said frame in any one of a plurality of positions so as to accommodate unit record cards of varying dimensions.

3. A unit record card processing machine of the type described in claim 2 wherein said second electrically conductive member includes an elongated extension at a different elevation from the remainder of said first electrically conductive member so as to provide an initial engagement location for individual ones of said cards.

4. A unit record card processing machine comprising:
an electrically grounded frame;
feed means mounted on said frame for feeding unit record cards along a predetermined path within said frame;
a unit record card stacking receptacle;
a first guide member mounted on said frame and projecting into said predetermined path for deflecting unit record cards into said stacking receptacle, said first guide member comprising:
 a first electrically conductive member mounted on said frame;
 a second electrically conductive member positioned relative to said stacking receptacle so as to momentarily support one edge of each unit record card, and receive a portion of the spurious electrostatic charge therefrom, and thereby electrostatically repel said unit record card; and
 a dielectric member mounted on said first electrically conductive member and supporting said second electrically conductive member, said dielectric member having a shunt resistance which is sufficiently high to allow said second electricaly conductive member to receive an electrostatic charge for repelling each unit record card, but sufficiently low that the electrostatic charge imparted to said second electrically conductive member by each unit record card is dissipated through leakage current before the arrival of the next unit record card; and
a second guide member positioned relative to said first guide member so as to guide the opposite edge of said unit record cards to fall in an arc for edgewise stacking so that said opposite edge rests on said stacking receptacle;
said stacking receptacle being separated from said first guide means by a distance greater than the length of said record element, whereby said one edge of said record element, after making contact with said one conductive member, is electrostatically repelled therefrom, thereby falling from said first guide means when said opposite edge reaches a predetermined position relative to said first guide means.

References Cited by the Examiner

UNITED STATES PATENTS 2,576,882 11/1951 Koole et al. ---------- 317—2 X

ROBERT B. REEVES, *Primary Examiner.*